3,356,664
UNSATURATED POLYMER, DERIVATIVES AND PROCESS OF PREPARATION

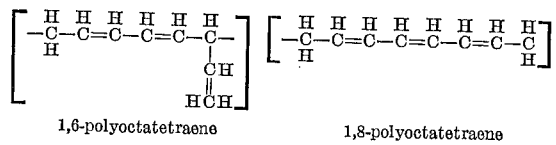

Richard P. Rhodes, Roselle, and Donald A. Guthrie, Cranford, N.J., assignors to Esso Research and Engineering Company, a corporation of Delaware
No Drawing. Filed Oct. 26, 1961, Ser. No. 148,309
5 Claims. (Cl. 260—93.7)

ABSTRACT OF THE DISCLOSURE

Linear rubbery polymers of the polyenes 1,3,5-hexatriene and 1,3,5,7-octatetraene are prepared by reacting the monomeric polyenes in a dilute nonpolar organic solvent in the presence of butyl lithium catalyst.

---

This invention relates to novel polymers of conjugated multiolefin compounds of three double bonds and greater, in particular to the triolefin 1,3,5-hexatriene, to a process for making these polymers and their derivatives, and to utilization of the polymers and their derivatives.

It has now been found, in accordance with the present invention, that a particular method for polymerizing multiolefin compounds of three double bonds and greater, and in particular 1,3,5-hexatriene, in dilute hydrocarbon solution with a small amount of butyl lithium catalyst, e.g. in the range of about 0.1 to 1 wt. percent based on the conjugated polyolefin, the kind and degree of polymerization can be controlled to form a polymer of sufficiently high molecular weight to be a rubbery elastomer with diminished cyclization and low loss of reactive organic double bonds by crosslinking. This kind of polymer has distinctive properties of miscibility with solvents such as benzene, heptane, and carbon tetrachloride. It has a high reactivity, as shown by the ease of its reaction with bromine at room temperature to the extent of 75% of the possible two double bonds per six carbon units. Other distinctive properties will become apparent from the following description.

The controlled polymerization of conjugated multiolefins containing three double bonds and greater can produce a variety of polymer structures, depending on the exact nature of the monomer feed, which can be a mixture of cis and trans forms, and depending on the control of the polymerization. Thus, recurring units of the polymers may have the following structures obtained from 1,3,5-hexatriene:

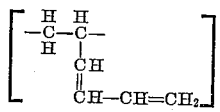

1,2-polyhexatriene

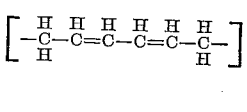

1,6-polyhexatriene

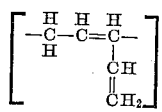

1, 4-polyhexatriene

In a like manner, 1,3,5,7-octatetraene may be polymerized to yield the following structures:

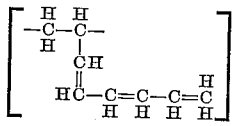

1,2 polyoctatetraene

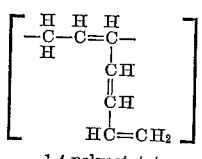

1,4-polyoctatetraene

[formulas for 1,6-polyoctatetraene and 1,8-polyoctatetraene]

1,6-polyoctatetraene   1,8-polyoctatetraene

Higher conjugated multiolefin compounds thus yield mixtures of the various possible isomeric units. In all cases these highly conjugated units are very reactive for free radical reactions. This reactivity includes curing or crosslinking reactions as well as addition reactions, such as reaction with $N_2F_4$, halogens and other groups which tend to add best to carbon atoms interlinked by conjugated double bonds.

Units with other structures may occur in the desired polymers. The rubbery characteristics, the molecular weight, and other properties of the preferred polymers indicate that these polymers, to a large extent, are of the linear type.

The formation of rubbery polymers with as much unsaturation and reactivity, as exhibited by the 1,3,5-hexatriene linear-type polymers, is quite surprising because the conjugated hexatriene was expected to form crosslinked compounds of a branched insoluble nature on account of the possibility of molecules of the hexatriene reacting with another molecule at a variety of reactive double bond positions.

Advantage can be taken of the reactivity of the double bonds in these hexatriene polymers, or such polymers containing conjugated double bonds, to form adducts thereof and to use the polymers or their adducts as crosslinking agents for rubber or synthetic elastomers provided care is taken in the preparation and storage of the polymers. It is particularly necessary that free radical scavengers be added to the polymerization reaction mixture upon attainment of the desired degree of polymerization. These agents can be added in an alcohol solution which will cause the termination of all polymerization at the desired point. The amount of alcohol used should be stoichiometric with the quantity of butyl lithium used. The radical scavengers may be tert. butyl hydroquinone, tert. butyl catechol, or a similar material which will stop crosslinking by preferentially reacting with radicals from traces of oxygen and other materials. These inhibitors, when used in the amount of about 0.1%, do not materially affect addition of high radical yield materials such as $N_2F_4$.

The preferred monomeric reactants are the polyolefins having 3 to 5 double bonds, as in $C_6$ to $C_{10}$ polyolefins.

In a particular use of the unsaturated and reactive polymers of the conjugated multiolefin type, e.g. 1,3,5-hexatriene, high-energy derivatives are prepared by reacting such polymers, even under very mild conditions, with tetrafluorohydrazine, $N_2F_4$, to form a rocket propellant binder. Thus, readily-formed $N_2F_4$ adducts of these polymers have a high $NF_2$ content, outstanding thermal stability, residual unsaturation and adequate high molecular weight for setting or curing in a composite with other fuel and oxidizer ingredients.

A method of obtaining the 1,3,5-hexatriene monomer is that of dehydrating 1,3-hexadiene-5-ol over activated alumina. This method has been regarded as producing mostly the trans form. The polymerization procedure involves forming a dilute solution of the conjugated hexatriene in a liquid hydrocarbon or relatively nonsolid hydrocarbon solvent, admixing a small amount of the catalyst, butyl lithium, e.g. about 0.1 to 1 wt. percent based on the hexatriene, and stirring the mixture while excluding moisture, oxygen, free radical initiators, or oxidizing gas. The polymerization temperature is kept low, e.g. about 0° to 30° C., so that the polymerization proceeds at a rate of about 80% reaction in 4 hours. The rate and degree of polymerization must be controlled since too much polymerization results in crosslinking. A suitable period of polymerization is 3 to 4 hours at a polymerization temperature of 25° C. Apparent modifications can be made in the procedure consistent with the principles set forth.

*Example 1*

A dilute benzene solution containing 1,3,5-hexatriene and 0.5 wt. percent butyl lithium, based on the weight of the hexatriene in solution, was stirred for up to about 3 hours at 25° C. The polymer obtained was soluble in the benzene when great care was taken to exclude $H_2O$ and $O_2$ from the reaction zone. The polymer obtained from evaporating the solution was observed to be a rubbery solid with strong tendencies to react with oxygen. A portion of the polymer from which $H_2O$ and $O_2$ were excluded was dissolved in carbon tetrachloride and brominated at room temperature to determine that 75% of the theoretical unsaturation (2 double bonds per 6 carbon atoms) was readily reactive to bromine.

The following example illustrates the method of treatment and reaction to form high-energy adducts of the hexatriene polymer.

*Example 2*

Using a portion of the benzene solution of the hexatriene polymer formed as described in Example 1, 0.1% of tertiary butyl catechol, based on the weight of the polymer, was added to the solution to inhibit crosslinking and cyclization before reaction. To the inhibited polymer solution was added an excess of $N_2F_4$ for reaction with the double bonds of the polymer. The mixture of the $N_2F_4$ and polymer solution was maintained at 25° C. with agitation for a period of 65 hours so that the polymer reacted with the $N_2F_4$ to form an adduct having about a 50 wt. percent $NF_2$ content. This level was obtained in a number of runs. Increasing the temperature of the polymer solution mixed with the $N_2F_4$ under pressure increased the $NF_2$ content. Typical reaction conditions and analyses of the polymer products are given in the following table:

TABLE I

| Polymer | $N_2F_4$ Treatment | $NF_2$ Content Based On— | |
|---|---|---|---|
| | | Percent N | Percent F |
| Fresh | 16 hrs., 23° C., 0.5 atm | 48.5 | 52.0 |
| Do | 65 hrs., 23° C., 14 atm | 59.5 | 61.9 |
| 1 day old | 65 hrs., 23° C., 26 atm | 55.3 | 58.6 |
| 5 days old | 16 hrs., 23° C., 25 atm.—then to 5.5 hrs., 60° C., 28 atm. | 55.7 | 56.5 |

Several repeat runs were made which showed that polymer adduct containing approximately 50% $NF_2$ can be produced by low-pressure $N_2F_4$ reaction at room temperature, provided the starting polymer is fresh.

Among the highest molecular weight adducts of the hexatriene polymers that were produced were those having a molecular weight of about 7,000 with an analysis of about 57 wt. percent $NF_2$. The molecular weights were obtained through the boiling-point depression in acetone. Other batches of the hexatriene polymer treated with $N_2F_4$ had a 50% $NF_2$ level and molecular weights in the range of about 1,000 to 3,000.

In reacting the lower molecular weight adducts with $N_2F_4$, to increase the $NF_2$ content up to about 58 wt. percent, the temperature was kept sufficiently low to minimize crosslinking of the polymers or disruption of the reactive double bonds. Some particular characteristics of the hexatriene polymer-$N_2F_4$ adducts are summarized as follows:

(a) The adducts are soluble in polar organic solvents such as acetone and acetonitrile.

(b) The adducts have an acceptably high $NF_2$ level which is obtained at a low-temperature reaction of the polymers with $N_2F_4$, yet leaving reactive unsaturation in the polymer for curing.

(c) The molecular weight of the polymer adducts is sufficiently high for desired physical properties such as good tensile strength and percent elongation.

(d) The $N_2F_4$ adducts of the hexatriene polymers have been demonstrated to have high thermal stability compared to $N_2F_4$ adducts of polybutadiene, which is a polymer having principally recurring units containing only one double bond. In general, the polybutadiene adducts have a lower molecular weight due to the more intense conditions needed for the reaction of the $N_2F_4$ with polybutadiene.

The relatively higher stability of the polyhexatriene-$N_2F_4$ adducts is illustrated in the following table:

TABLE II.—STABILITY TESTS AT TEMPERATURE OF 90° C.

| Adduct | Gas Evolution, cc. of Gas/Gram of Material | Hours |
|---|---|---|
| Polybutadiene—55% $NF_2$ | 80 | 100 |
| | 70 | 20 |
| | 30 | 0.5 |
| Polyhexatriene—58% $NF_2$ | 59 | 100 |
| | 50 | 20 |
| | 20 | 1 |

The $N_2F_4$-hexatriene polymer adducts have been found to be satisfactory in formulating high specific impulse rocket propellants, such as shown by the following formulation:

20% tetrakis (difluoramino) butane
57% hydrazine nitroformate
3% boron
20% hexatriene polymer adduct containing 58% $NF_2$
Isp—275 seconds.

The $N_2F_4$-modified polyhexatriene has very desirable rubbery properties, while at the same time containing a high level of $NF_2$ groups without degradation. This is in contrast to $N_2F_4$ adducts of diolefin polymers which, in general, require more drastic addition reaction conditions leading to degradation and loss of rubbery properties. The polyhexatrienes with 50% $NF_2$ content contain a sufficient amount of unsaturation for the addition of up to about 20% more $NF_2$ or addition of other energy groups if the residual unsaturation is not to be used for crosslinking in formulating the solid propellant.

Binders are important ingredients for imparting strength and rigidity to solid propellant composites which may contain powdered solid fuel ingredients, e.g. powdered metals such as beryllium, boron, aluminum, and magnesium and their hydrides in powdered form. The composites may also contain other oxidizers known as oxygen oxidizers, such as hexanitroethane, nitroboron salts, and perchlorate salts. The composites may also contain compatible oxidizer liquids such as liquid $NF_2$-containing compounds. The composite may require from about 5 to 35 wt. percent of binder, usually 10 to 20 wt. percent. Various known curing methods which can be used for curing the $NF_2$-containing polydiolefins can be used for curing the $NF_2$-containing polyhexatrienes or such polymers containing conjugated double bonds. Also, the introduction of other energy groups can be made into the polyhexatrienes, such as nitro groups, with ease on account of the high reactivity of the unsaturated bonds of the polyhexatrienes.

It is intended that the appended claims embrace in their scope all novelty inherent in the invention as described, as well as modifications and equivalents derived therefrom.

What is claimed is:

1. Rubbery linear polymers of 1,3,5-hexatriene having a molecular weight of about 1,000 to 7,000 and characterized by high reactivity, such that the double bonds determined as being 2 double bonds per 6 carbon atoms in the polymer recurring units are saturated to the extent of about 75% with bromine by a reaction with bromine at 25° C.

2. Process for making unsaturated linear polymers of hexatriene having molecular weights in the range of about 1,000 to 3,000 which comprises reacting a dilute solution of 1,3,5-hexatriene in a nonpolar organic solvent containing a catalytic amount of butyl lithium at temperatures in the range of 0° to 30° C.

3. Rubbery linear polymers of monomeric conjugated double bond polyenes which contain 3 to 4 conjugated double bonds, said monomeric polyenes being selected from the group consisting of 1,3,5-hexatriene and 1,3,5,7-octatetraene, said polymers having molecular weights of about 1,000 to 7,000, being miscible with benzene as a hydrocarbon solvent at 25° C., and being further characterized by being capable of high reactivity with bromine to the extent that the 2–3 double bonds per recurring unit in the polymer are 75% saturated with bromine by reaction with bromine at 25° C. while said polymers are in a freshly formed state and inhibited from crosslinking.

4. Rubbery linear polymers as defined in claim 3, which are inhibited from cosslinking and from cyclization by a small amount of about 0.1 wt. per cent of a inhibitor selected from the group consisting of tertiary butyl hydroquinone and tertiary butyl catechol.

5. Process for making unsaturated linear polymers of a monomeric conjugated double bond polyene selected from the group consisting of 1,3,4-hexatriene and 1,3,5,7-octatetraene, which comprises reacting the monomeric polyene in a dilute benzene solution of the monomeric polyene with about 0.1 to 1 wt. percent of butyl lithium catalyst based on the monomeric polyene at a polymerization temperature in the range of 0° to 30° C. to form a linear polymer of the monomeric polyene, said polymer having a molecular weight of about 1,000 to 7,000, and inhibiting crosslinking of the resulting linear polymer in the benzene solution by admixing with said solution about 0.1 wt. percent of tertiary butyl catechol based on the weight of the polymer.

References Cited

Woods et al.: J. Am. Chem. Soc., vol. 78, pages 4380–4383 (1956).

JOSEPH L. SCHOFER, *Primary Examiner.*

L. D. ROSOL, *Examiner.*

J. W. WHISLER, M. B. KURTZMAN,
*Assistant Examiners.*